(12) United States Patent
Ning et al.

(10) Patent No.: US 11,331,657 B2
(45) Date of Patent: May 17, 2022

(54) METHOD OF PREPARING CATALYST FOR LOW-TEMPERATURE SYNERGISTIC CATALYTIC PURIFICATION OF $NO_x$ AND HCN IN FLUE GAS, AND USE THEREOF

(71) Applicant: Kunming University of Science and Technology, Kunming (CN)

(72) Inventors: Ping Ning, Kunming (CN); Xueqian Wang, Kunming (CN); Qi Wang, Kunming (CN); Langlang Wang, Kunming (CN); Qiang Ma, Kunming (CN); Yingjie Zhang, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 213 days.

(21) Appl. No.: 16/722,936

(22) Filed: Dec. 20, 2019

(65) Prior Publication Data
US 2020/0197922 A1     Jun. 25, 2020

(30) Foreign Application Priority Data

Dec. 21, 2018 (CN) .......................... 201811571887.4

(51) Int. Cl.
| | | |
|---|---|---|
| *B01D 53/86* | (2006.01) | |
| *B01J 37/04* | (2006.01) | |
| *B01J 37/08* | (2006.01) | |
| *B01J 23/72* | (2006.01) | |
| *B01J 23/83* | (2006.01) | |
| *B01J 21/06* | (2006.01) | |
| *B01J 35/10* | (2006.01) | |

(52) U.S. Cl.
CPC .......... *B01J 37/04* (2013.01); *B01D 53/8628* (2013.01); *B01J 21/063* (2013.01); *B01J 23/72* (2013.01); *B01J 23/83* (2013.01); *B01J 37/08* (2013.01); *B01D 2257/404* (2013.01); *B01D 2257/408* (2013.01); *B01D 2258/0283* (2013.01); *B01J 35/1014* (2013.01); *B01J 35/1038* (2013.01); *B01J 35/1061* (2013.01)

(58) Field of Classification Search
None
See application file for complete search history.

(56) References Cited

U.S. PATENT DOCUMENTS 8,709,306 B2 * 4/2014 Jin ........................... B01J 23/22
                                                    252/583

* cited by examiner

*Primary Examiner* — Sheng H Davis
(74) *Attorney, Agent, or Firm* — Marshall, Gerstein & Borun LLP

(57) ABSTRACT

The present invention discloses a method of preparing a catalyst for low-temperature synergistic catalytic purification of $NO_x$ and HCN in a flue gas, and the use thereof. Citric acid is dissolved in ethanol to obtain a citric acid/ethanol solution; tetrabutyl titanate is added, mixed uniformly to obtain a tetrabutyl titanate-citric acid/ethanol solution; glacial acetic acid is added dropwise to react for 30-40 min to obtain a solution A; the metal salt solution was added dropwise into the solution A, mixed uniformly and added with nitric acid, ammonium hydroxide is added dropwise to adjust the pH value, and the temperature is raised at a constant speed to obtain a gel B; dried and then then baked at a temperature of 300-500° C. for 3-4 h, cooled in the furnace, pulverized, tableted and sieved to obtain the catalyst for the low-temperature synergistic catalytic purification of $NO_x$ and HCN in the flue gas.

18 Claims, 5 Drawing Sheets

METHOD OF PREPARING CATALYST FOR LOW-TEMPERATURE SYNERGISTIC CATALYTIC PURIFICATION OF $NO_x$ AND HCN IN FLUE GAS, AND USE THEREOF

TECHNICAL FIELD

The present invention relates to a method of preparing a catalyst for low-temperature synergistic catalytic purification of $NO_x$ and HCN in a flue gas, and the use thereof, and belongs to the technical field of flue gas purification.

BACKGROUND

The coke oven flue gas has a complex composition, and contains gaseous pollutants such as a large amount of $NO_x$, $SO_2$ and HCN and a small amount of VOCs. Conventional coke oven flue gas treatment techniques typically only treat conventional contaminants such as $SO_2$ and $NO_x$ contained in the coke oven flue gas. However, the direct discharge of the unconventional contaminant HCN in the flue gas can have a serious impact on the environment. HCN is a highly toxic gas, and inhalation of a high concentration of hydrogen cyanide gas in a short period of time can lead to acute poisoning and thus death. HCN has a strong toxicity and corrosivity, which not only easily causes corrosion of a raw material gas pipeline and reduces the service life of the equipment, but also may cause poisoning of a downstream catalyst and increase the processing cost. Furthermore, HCN is a precursor of $NO_x$ and is involved in the formation of a photochemical smog. Improving the quality of urban ambient air urgently requires advances in coking chemical industry production processes and pollution control technologies. Therefore, the purification of HCN in the coke oven gas cannot be ignored.

The existing method for desulfurization and denitrification of the coke oven flue gas requires repeated heating and cooling of the flue gas, and has a cumbersome process. The temperature range of the coke oven flue gas after treatment processes such as desulfurization and dust removal is 150-200° C. Moreover, the traditional SCR denitration process requires a temperature of 320-400° C., which needs to heat the flue gas after the dust removal to reach the denitration temperature before it enters a reaction system. At present, low-temperature SCR denitrification is the major concern for purifying the coke oven flue gas. The core element of low-temperature denitration is a catalyst with high catalytic efficiency at low temperature. However, currently there is no catalyst for low temperature denitration with high efficiency.

SUMMARY

Directed at the technical problem of low-temperature denitration, the present invention provides a method of preparing a catalyst for low-temperature synergistic catalytic purification of $NO_x$ and HCN in a flue gas. In the present invention, a synergistic catalyst which has a high efficiency under low temperature is prepared by controlling the pH value in a sol-gel process, where the high-activity $NH_3$ generated by hydrolysis of HCN at low temperature is used as a strong reducing agent to catalytically convert $NO_x$ into $N_2$, which greatly improves the catalytic conversion rate of $NO_x$ and the low-temperature purification efficiency, and reduces the supply of $NH_3$ in the system. Due to the continuous consumption of the product $NH_3$ and also the maximum facilitation of the hydrolysis reaction of HCN, the $NO_x$ generated by an oxidation reaction of HCN is reduced, thereby realizing waste control by waste and detoxifying and harmless disposal of the product. The method of the present invention can realize high-efficiency denitration at low temperature, eliminate the heating or heat exchange process of the flue gas before an existing denitration process, simplify the process section, and reduce energy consumption and running cost.

A method of preparing a catalyst for low-temperature synergistic catalytic purification of $NO_x$ and HCN in flue gas, includes the following specific steps:

(1) dissolving an active metal salt in deionized water to obtain a metal salt solution, where the active metal salt is two or more of a lanthanum salt, a cobalt salt, an aluminum salt, a copper salt, an iron salt, a manganese salt, a cerium salt, a nickel salt and a niobium salt;

(2) dissolving citric acid in ethanol under stirring to obtain a citric acid/ethanol solution; then adding tetrabutyl titanate into the citric acid/ethanol solution, mixing uniformly, and reacting for 20-30 min to obtain a tetrabutyl titanate-citric acid/ethanol solution;

(3) adding glacial acetic acid dropwise into the tetrabutyl titanate-citric acid/ethanol solution of the step (2) under stirring to react for 30-40 min to obtain a solution A;

(4) adding the metal salt solution of the step (1) dropwise into the solution A of the step (3), mixing uniformly and adding nitric acid, then adding ammonium hydroxide dropwise to adjust the pH value of the system to 3-5 or 9-11, and rising the temperature at a constant speed until the temperature is 70-80° C. to obtain a gel B; and (5) subjecting the gel B of the step (4) to a constant-temperature treatment under a condition of a temperature of 90-110° C. for 2-3 days, then baking under a condition of a temperature of 300-500° C. for 3-4 h, cooling in the furnace, pulverizing, tableting, and sieving to obtain the catalyst $M-N/TiO_2$ for low-temperature synergistic catalytic purification of $NO_x$ and HCN in the flue gas, where M-N is two or more metal oxides of active metals lanthanum, cobalt, aluminum, copper, iron, manganese, cerium, nickel and niobium.

The mass percentage of the active metal oxide M-N in the catalyst $M-N/TiO_2$ is 5%-15%.

The molar ratio of citric acid to tetrabutyl titanate in the step (2) is (1-1.2):1, and the concentration of citric acid in the citric acid/ethanol solution is 0.16-0.26 g/ml.

The volume ratio of the citric acid/ethanol solution to tetrabutyl titanate in the step (2) is (2.4-4.1):1.

The volume ratio of glacial acetic acid to tetrabutyl titanate in the step (3) is (0.6-1.4):1.

The volume ratio of nitric acid to tetrabutyl titanate in the step (4) is (0.6-1.4):1, and the constant rate of temperature rising is 2.5-3.5° C./h.

The catalyst of the present invention can be used for low-temperature synergistic catalytic purification of $NO_x$ and HCN in the flue gas.

Under the action of the low-temperature synergistic catalyst $M-N/TiO_2$ for $NO_x$ and HCN, HCN is subjected to catalytic hydrolysis and catalytic oxidation reactions with oxygen and water vapor in the flue gas under low temperature to generate $N_2$, $NH_3$ and $CO_2$; $NH_3$ is catalytically converted into $N_2$ by reacting with $NO_x$; and highly active $NH_3$ generated by the catalytic hydrolysis of HCN has a very high reaction activity, which is much higher than the activity of the addition of $NH_3$. Subsequently in the SCR denitration reaction, the highly active $NH_3$ preferentially reacts with $NO_x$ rapidly, which breaks the barrier of the high energy required for the SCR reaction and greatly increases the reaction rate and catalytic efficiency, thereby reducing the denitration temperature. Meanwhile, the continuous consumption of $NH_3$ in the denitration reaction not only facilitates the catalytic hydrolysis reaction of HCN to proceed to the right, but also inhibits the production of the by-product $NO_x$ due to the oxidation reaction of HCN, and also saves the supply of additional $NH_3$, achieving purposes of mutual promotion, waste control by waste, and synergistic catalytic purification of $NO_x$ and HCN.

The catalyzing principle of the catalyst of the present invention:

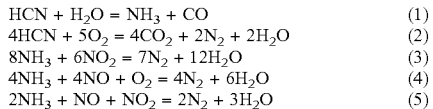

Under the action of the synergistic catalyst $M-N/TiO_2$ for $NO_x$ and HCN, HCN is subjected to catalytic hydrolysis and catalytic oxidation reactions with oxygen and water vapor in the flue gas under low temperature to generate $N_2$, $NH_3$ and $CO_2$; $NO_x$ is catalytically converted into $N_2$ by reacting with $NH_3$; and highly active $NH_3$ generated by the catalytic hydrolysis of HCN has a very high reaction activity, which is much higher than the activity of the addition of $NH_3$. Subsequently in the SCR denitration reaction, the highly active $NH_3$ preferentially reacts with $NO_x$ rapidly, which breaks the barrier of the high energy required for the SCR reaction and greatly increases the reaction rate and catalytic efficiency, thereby reducing the denitration temperature. Meanwhile, the continuous consumption of $NH_3$ in the denitration reaction not only facilitates the catalytic hydrolysis reaction of HCN to proceed to the right, but also inhibits the production of the by-product $NO_x$ due to the oxidation reaction of HCN, and also saves the supply of additional $NH_3$, achieving purposes of mutual promotion, waste control by waste, and synergistic catalytic purification of $NO_x$ and HCN.

The beneficial effects of the present invention:

(1) in the present invention, by controlling the pH of the solution in the process of preparing the catalyst by the sol-gel method at 3-5 or 9-11, the specific surface area, the pore diameter, the crystal structure of the carrier $TiO_2$, the active component distribution, the redox property and the acidic and basic sites are all in a better state under medium-strong acid or medium-strong alkali conditions, thereby achieving the high-efficiency catalytic performance of low-temperature synergistic catalytic purification of $NO_x$ and HCN in the flue gas;

(2) the catalyst of the present invention conducts high-efficient synergistic purification of $NO_x$ utilizing HCN in the flue gas, thereby reducing the temperature for denitration and the input of $NH_3$, where the catalyst has a synergistic catalytic effect on HCN and $NO_x$, and highly active $NH_3$ generated by the catalytic hydrolysis of HCN is preferentially involved in the catalytic reaction of $NO_x$, which lowers the activation energy required for the reaction and thus reduces the reaction temperature for denitration, thereby greatly improving the reaction rate and catalytic efficiency; the continuous consumption of $NH_3$ in the denitration reaction not only facilitates the catalytic hydrolysis reaction of HCN to proceed to the right, but also inhibits the production of the by-product $NO_x$ due to the oxidation reaction of HCN, and also saves the supply of additional $NH_3$, achieving purposes of mutual promotion, waste control by waste, and synergistic catalytic purification of $NO_x$ and HCN;

(3) compared with the traditional denitration method, the catalyst of the present invention eliminates the heating or heat exchanging process of the denitration system in the application for the catalytic purification of HCN and $NO_x$ in the flue gas, such that the flue gas can directly enter the denitration process section after dust removal, so as to conduct the catalytic reaction under low temperature; and this simplifies the process section, and reduces the energy consumption and operating cost; and (4) the application method of the catalyst of the present invention has advantages such as high purification efficiency, a simple process flow, low energy consumption, and low operating cost.

DESCRIPTION OF THE EMBODIMENTS

Figure 1:
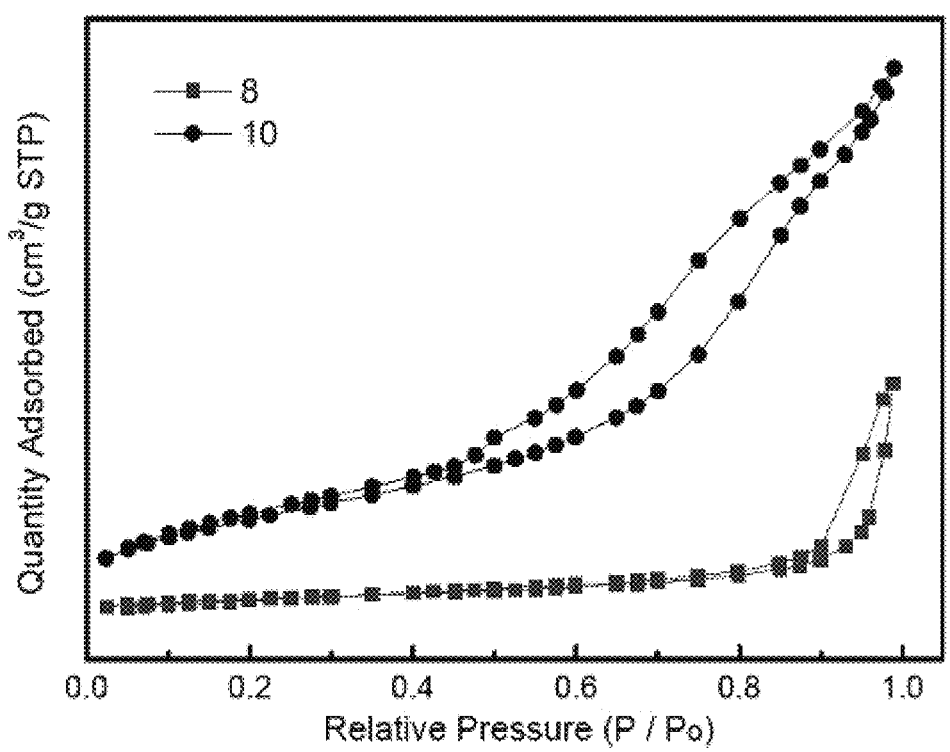
FIG. 1 shows nitrogen adsorption-desorption isotherms of the catalyst $La_1Cu_9/TiO_2$ of Example 1 and Comparative Example 1.

The present invention will be further described in detail hereafter with reference to specific embodiments, but the claimed scope of the present invention is not limited to the disclosure.

Example 1: in this example, the carrier of the catalyst for the low-temperature synergistic catalytic purification of $NO_x$ and HCN in the flue gas was $TiO_2$, the active components were $La_2O_3$ and CuO, and the mass percentage of the active components ($La_2O_3$ and CuO) was 10%, where $La_2O_3$ was 1% and CuO was 9%, and this was recorded as $La_1Cu_9/TiO_2$.

A method of preparing a catalyst for low-temperature synergistic catalytic purification of $NO_x$ and HCN in flue gas, included the following specific steps:

(1) the active metal salt $La(NO_3)_3 \cdot 6H_2O$ and $Cu(NO_3)_2 \cdot 6H_2O$ was dissolved in deionized water to obtain a metal salt solution, where the concentration of the metal cation in the metal salt solution was 0.475 mol/L;

(2) citric acid was dissolved in ethanol under stirring to obtain a citric acid/ethanol solution, where the molar ratio of citric acid to tetrabutyl titanate was 1:1, and the concentration of citric acid in the citric acid/ethanol solution was 0.19 g/mL; then tetrabutyl titanate was added into the citric acid/ethanol solution, mixed uniformly, and reacted for 25 min to obtain a tetrabutyl titanate-citric acid/ethanol solution, where the volume ratio of the citric acid/ethanol solution to tetrabutyl titanate was 3.2:1;

(3) glacial acetic acid was added dropwise into the tetrabutyl titanate-citric acid/ethanol solution of step (2) under stirring for 30 min to obtain a solution A; where the volume ratio of glacial acetic acid to tetrabutyl titanate was 0.6:1;

(4) the metal salt solution of the step (1) was added dropwise into the solution A of the step (3), mixed uniformly, and added with nitric acid, where the volume ratio of nitric acid to tetrabutyl titanate was 0.6:1; then ammonium hydroxide was added dropwise to adjust the pH value of the system to 10, and the temperature was raised at a constant speed until the temperature was 70° C. to obtain a gel B; where the constant rate of temperature rising was 2.5° C./h; and (5) the gel B of the step (4) was subjected to a constant-temperature treatment under a condition of a temperature of 90° C. for 3 days, and then baked at a temperature of 350° C. for 4 h, cooled in the furnace, pulverized, tableted and sieved to obtain the catalyst $La_1Cu_9/TiO_2$ for the low-temperature synergistic catalytic purification of $NO_x$ and HCN in the flue gas.

The method of applying this example in the low-temperature synergistic catalytic purification of $NO_x$ and HCN in the coke oven flue gas, included the following specific steps:

(1) placing the catalyst $La_1Cu_9/TiO_2$ for the low-temperature synergistic catalytic purification of $NO_x$ and HCN in the flue gas of this example in a fixed bed quartz tube reactor;

(2) the temperature of the fixed bed reactor was set as 150° C., and the simulated flue gas was mixed uniformly and introduced into the reactor for a catalytic reaction, where the simulated flue gas contained 100 ppm of $NO_x$, 100 ppm of HCN, 50 ppm of $NH_3$, had a relative humidity of 10%, a $O_2$ volume fraction of 5%, and the balance of $N_2$; the total gas flow rate was 600 mL/min, and the reactor air speed was 50,000 $h^{-1}$; and (3) the concentrations of $NO_x$, HCN, $NH_3$, CO, and $CO_2$ in the simulated flue gas at the outlet of the fixed reactor in the step (2) was detected.

The test results were as follows: when at 150° C., the catalyst $La_1Cu_9/TiO_2$ (pH=10) for the low-temperature synergistic catalytic purification of $NO_x$ and HCN of this example was used, the purification efficiencies of $NO_x$ and HCN reached 95.50% and 100%, respectively; and the catalyst performed well under the condition of the complex gas composition: the catalyst had a long service life, a high synergistic catalytic activity, and a stable performance.

Example 2: the method for preparing the catalyst of this example was basically the same as that of Example 1, except that in the step (4) ammonium hydroxide was added dropwise to adjust the pH value of the system to 11.

The application of the catalyst of this example was the same as that of the method of Example 1, and the test results were as follows: when at the temperature of 150° C., the catalyst $La_1Cu_9/TiO_2$ (pH=11) for the low-temperature synergistic catalytic purification of $NO_x$ and HCN was used, the purification efficiencies of $NO_x$ and HCN were 94.28% and 98.65%, respectively.

Example 3: the method for preparing the catalyst of this example was basically the same as that of Example 1, except that in the step (4) ammonium hydroxide was added dropwise to adjust the pH value of the system to 9.

The application of the catalyst of this example was the same as that of the method of Example 1, and the test results were as follows: when at the temperature of 150° C., the catalyst $La_1Cu_9/TiO_2$ (pH=9) for the low-temperature synergistic catalytic purification of $NO_x$ and HCN was used, the purification efficiencies of $NO_x$ and HCN were 92.15% and 96.69%, respectively.

Comparative Example 1: the method for preparing the catalyst of this comparative example was basically the same as that of Example 1, except that in the step (4) ammonium hydroxide was added dropwise to adjust the pH value of the system to 8;

The application of the catalyst of this comparative example was the same as that of Example 1, and the test results were as follows: when at the temperature of 150° C., the catalyst $La_1Cu_9/TiO_2$ (pH=8) for the low-temperature synergistic catalytic purification of $NO_x$ and HCN was used, the purification efficiencies of $NO_x$ and HCN were 49.67% and 58.65%, respectively.

The nitrogen adsorption-desorption isotherm diagram of the catalyst $La_1Cu_9/TiO_2$ of Example 1 and this Comparative Example was as shown in FIG. 1. As could be seen from FIG. 1, the two adsorption-desorption isotherms, in each of which a hysteresis loop occurred and for the catalyst $La_1Cu_9/TiO_2$ at pHs of 8 and 10 respectively, both belonged to the isotherm of type IV; no adsorption saturation platform appeared in a region had a relatively higher pressure, demonstrating that the pore distribution was uneven, and both the surface and the interior of the catalyst contained micropores and mesopores; and the hysteresis loop of the isotherm at the pH of 8 was narrower than that at the pH of 10, indicating that the sample having the pH of 8 had a narrower pore diameter distribution.

Figure 2:
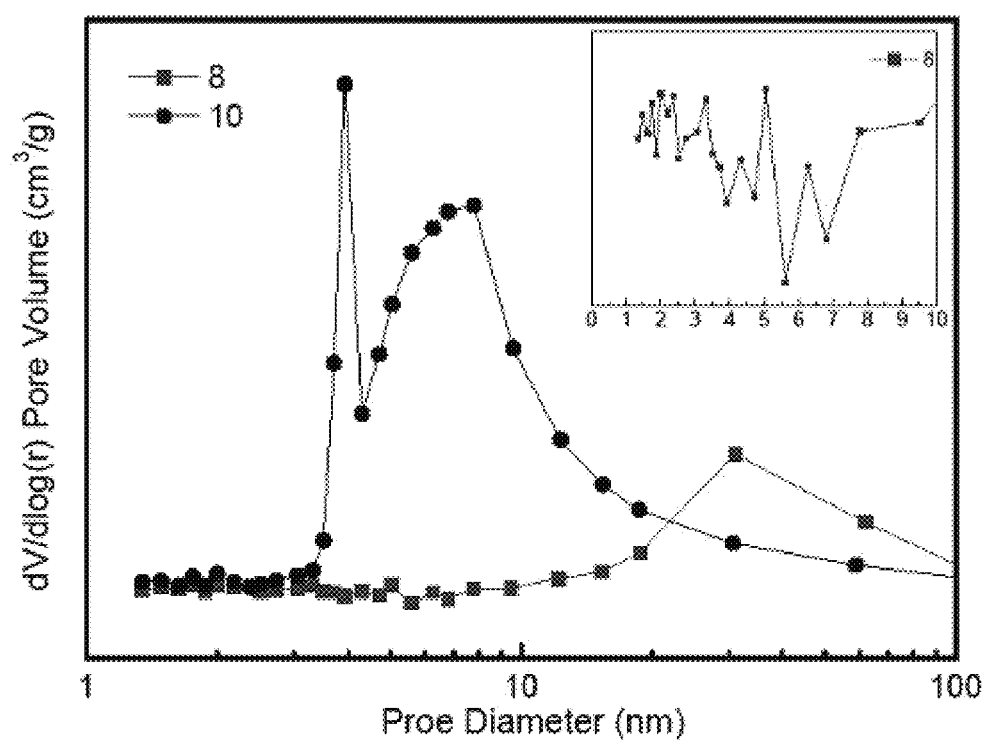
FIG. 2 shows the pore diameter distribution of the catalyst $La_1Cu_9/TiO_2$ of Example 1 and Comparative Example 1.

The pore diameter distribution diagram of the catalyst $La_1Cu_9/TiO_2$ of Example 1 and this comparative example was as shown in FIG. 2. As could be seen from FIG. 2, the pores of the sample having the pH of 10 were distributed as having two sharp peaks between 3-7 nm while the pores of the sample having the pH of 8 had a plurality of small peaks distributed within 1-10 nm and had a relatively smaller pore diameter; and Table 1 showed the surface area, the pore volume and the pore diameter of the catalyst $La_1Cu_9/TiO_2$. In connection with the pore diameter distribution diagram of FIG. 2 and Table 1, the catalyst having the pH of 10 had a specific surface area of 64.369 $m^2/g$, which was much greater than the specific surface area of 13.505 $m^2/g$ of the catalyst having the pH of 8.

TABLE 1

The surface areas, pore volumes and pore diameters of the catalyst $La_1Cu_9/TiO_2$ of Example 1 and this comparative example

| Samples | BET surface area ($m^2/g$) | Pore volume ($cm^3/g$) | Pore Diameter (nm) |
|---|---|---|---|
| 8 | 13.505 | 0.047 | 1.486 |
| 10 | 64.369 | 0.112 | 3.935 |

In connection with the pore diameter distribution diagram of FIG. 2 and Table 1, the catalyst having the pH of 10 had a specific surface area of 64.369 $m^2/g$, which was much greater than the specific surface area of 13.505 $m^2/g$ of the catalyst having the pH of 8.

Figure 3:
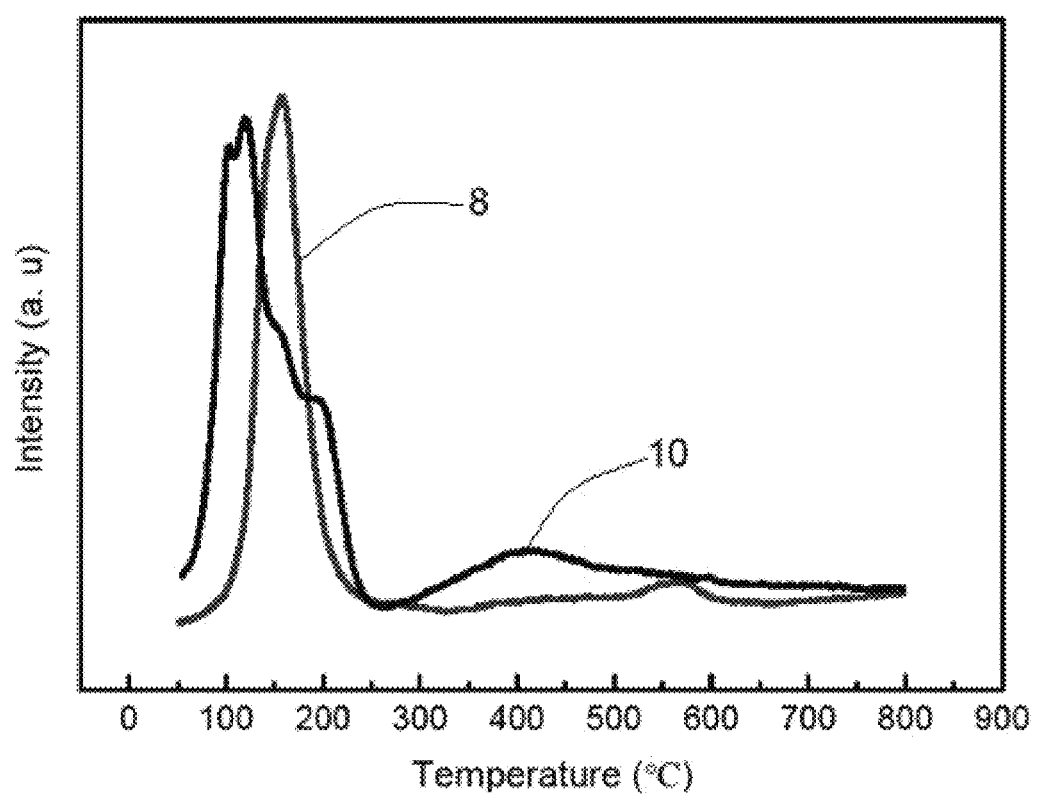
FIG. 3 is an $H_2$-TPR diagram of the catalyst $La_2O_3$—$CuO/TiO_2$ of Example 1 and Comparative Example 1.

The H2-TPR diagram of the catalyst $La_2O_3$—$CuO/TiO_2$ of Example 1 and this comparative example was as shown in FIG. 3. As could be seen from FIG. 3, for the catalyst having the pH of 10: the reduction peak near 110° C. belonged to the reduction of highly dispersed CuO; the reduction peak near 147° C. corresponded to reducing $Cu^{2+}$ into elemental Cu; and the shoulder peak near 200° C. belonged to the reduction of the bulk CuO; for the catalyst having the pH of 8: there was a main peak near 155° C., which corresponded to reducing $Cu^{2+}$ into elemental Cu; and the reduction peak temperature of the catalyst having the pH of 10 was lower than that of the catalyst having the pH of 8, indicating that the catalyst having the pH of 10 had a higher reductivity at a lower temperature, which was also the reason why this catalyst had a higher conversion rate of HCN and a higher catalytic conversion efficiency of $NO_x$ at low temperature.

Figure 4:
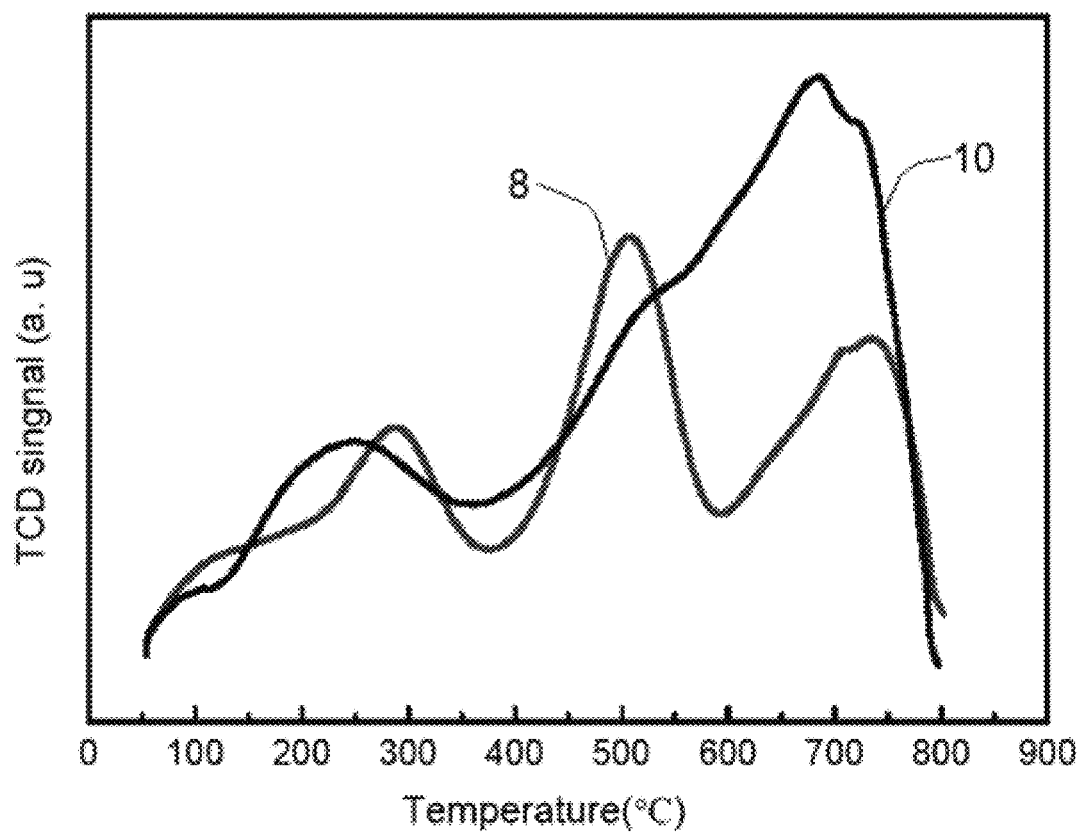
FIG. 4 is a $NH_3$-TPD diagram of the catalyst $La_2O_3$—$CuO/TiO_2$ of Example 1 and Comparative Example 1.

The $NH_3$-TPD diagram of the catalyst $La_2O_3$—$CuO/TiO_2$ of Example 1 and this comparative example was as shown in FIG. 4. As could be seen from FIG. 4, three major $NH_3$ desorption peaks occurred at one time from low temperature to high temperature, which corresponded to a weakly acidic adsorption site, a moderately-to-highly acidic site and a highly acidic adsorption site respectively; the catalyst having the pH of 10 had a stronger desorption peak at high temperature, indicating that the catalyst had more highly acidic sites than the catalyst having the pH of 8; and as there were more highly acidic adsorption sites, more of $NH_3$ generated by hydrolysis of HCN in the flue gas and the $NH_3$ added into the system could be adsorbed onto the surface of the catalyst to carry out the SCR denitration reaction.

Figure 5:
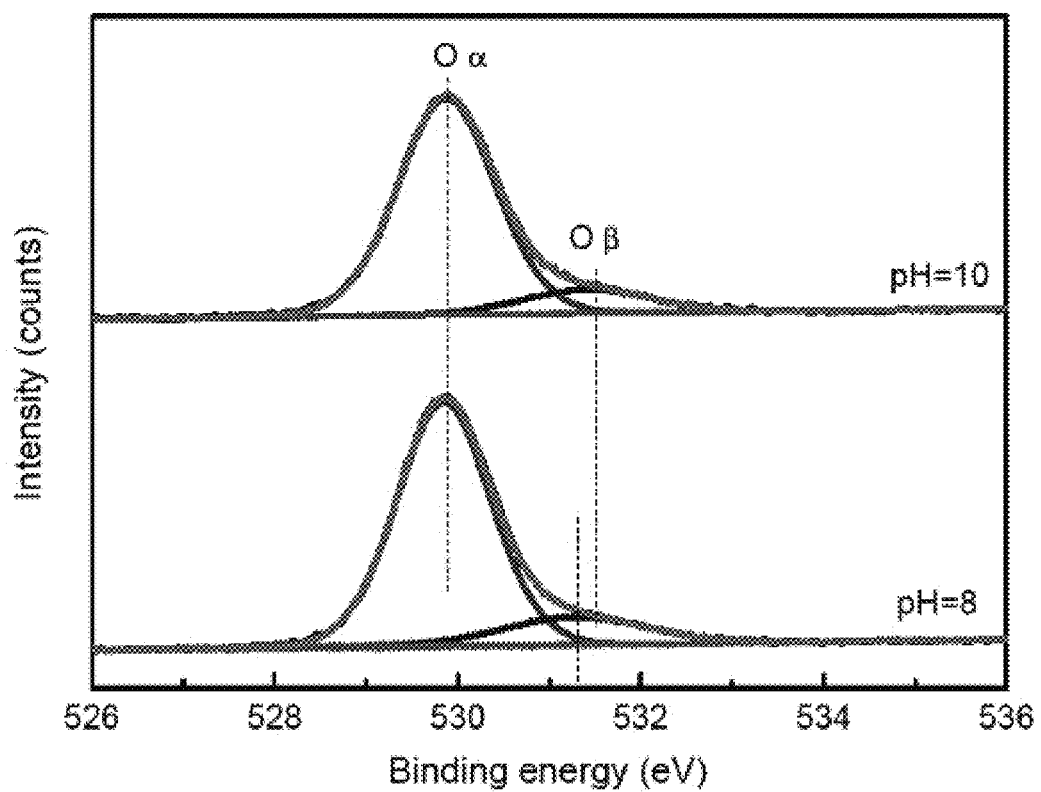
FIG. 5 is an O1sXPS diagram of the catalyst $La_2O_3$—$CuO/TiO_2$ of Example 1 and Comparative Example 1.

The O1s XPS diagram of the catalyst $La_2O_3$—$CuO/TiO_2$ of Example 1 and this comparative example was as shown in FIG. 5. As could be seen from FIG. 5, the figure showed two O 1 s peaks, where the peak near 529.8 eV belonged to lattice oxygen, and the peak near 531.7 eV belonged to chemisorbed oxygen on the surface of the catalyst; and the catalyst having the pH of 10 had a binding energy of chemisorbed oxygen higher than that of the catalyst having the pH of 8, indicating that the interaction between the chemisorbed oxygen and the catalyst was higher in the catalyst having the This shows that the interaction between chemisorbed oxygen and the catalyst was stronger in the catalyst having the pH of 10.

Comparative Example 2: the method for preparing the catalyst of this comparative example was basically the same as that of Example 1, except that in the step (4) ammonium hydroxide was added dropwise to adjust the pH value of the system to 12.

The application of the catalyst of this comparative example was the same as that of Example 1, and the test results were as follows: when at the temperature of 150° C., the catalyst $La_1Cu_9/TiO_2$ (pH=12) for the low-temperature synergistic catalytic purification of $NO_x$ and HCN was used, the purification efficiencies of $NO_x$ and HCN were 50.32% and 62.73%, respectively.

Example 4: in this example, the carrier of the catalyst for the low-temperature synergistic catalytic purification of $NO_x$ and HCN in the flue gas was $TiO_2$, the active components were $CeO_2$ and CuO, and the mass percentage of the active components ($CeO_2$ and CuO) was 15%, where $CeO_2$ was 7% and CuO was 8%, and this was recorded as $Ce_7Cu_8/TiO_2$.

A method of preparing a catalyst for low-temperature synergistic catalytic purification of $NO_x$ and HCN in flue gas, included the following specific steps:

(1) the active metal salt ($Ce(NO_3)_3 \cdot 6H_2O$ and $Cu(NO_3)_2 \cdot 6H_2O$) was dissolved in deionized water to obtain a metal salt solution; and the concentration of the metal cation in the solution was 0.562 mol/L;

(2) citric acid was dissolved in ethanol under stirring to obtain a citric acid/ethanol solution, where the molar ratio of citric acid to tetrabutyl titanate was 1.05:1, and the concentration of citric acid in the citric acid/ethanol solution was 0.23 g/mL; then tetrabutyl titanate was added into the citric acid/ethanol solution, mixed uniformly, and reacted for 30 min to obtain a tetrabutyl titanate-citric acid/ethanol solution, where the volume ratio of the citric acid/ethanol solution to tetrabutyl titanate was 4.1:1;

(3) glacial acetic acid was added dropwise into the tetrabutyl titanate-citric acid/ethanol solution of step (2) under stirring for 35 min to obtain a solution A; where the volume ratio of glacial acetic acid to tetrabutyl titanate was 1.4:1;

(4) the metal salt solution of the step (1) was added dropwise into the solution A of the step (3), mixed uniformly, and added with nitric acid, where the volume ratio of nitric acid to tetrabutyl titanate was 1.4:1; then ammonium hydroxide was added dropwise to adjust the pH value of the system to 4, and the temperature was raised at a constant speed until the temperature was 75° C. to obtain a gel B; where the constant rate of temperature rising was 3.5° C./h; and (5) the gel B of the step (4) was subjected to a treatment under a condition of a temperature of 100° C. for 2.5 days, and then baked at a temperature of 450° C. for 4 h, cooled in the furnace, pulverized, tableted and sieved to obtain the catalyst $Ce_7Cu_8/TiO_2$ for the low-temperature synergistic catalytic purification of $NO_x$ and HCN in the flue gas.

The method of applying this example in the low-temperature synergistic catalytic purification of $NO_x$ and HCN in the coke oven flue gas, included the following specific steps:

(1) placing the catalyst $Ce_7Cu_8/TiO_2$ for the low-temperature synergistic catalytic purification of $NO_x$ and HCN in the flue gas of this example in a fixed bed quartz tube reactor;

(2) the temperature of the fixed bed reactor was set as 150° C., and the simulated flue gas was mixed uniformly and introduced into the reactor for a catalytic reaction, where the simulated flue gas contained 200 ppm of $NO_x$, 100 ppm of HCN, 150 ppm of $NH_3$, had a relative humidity of 10%, a $O_2$ volume fraction of 5%, and the balance of $N_2$; the total gas flow rate was 600 mL/min, and the reactor air speed was 50,000 $h^{-1}$; and (3) the concentrations of $NO_x$, HCN, $NH_3$, CO, and $CO_2$ in the simulated flue gas at the outlet of the fixed reactor in the step (2) was detected.

The test results were as follows: when at the temperature of 150° C., the catalyst $Ce_7Cu_8/TiO_2$ (pH=4) for the low-temperature synergistic catalytic purification of $NO_x$ and HCN was used, the purification efficiencies of $NO_x$ and HCN reached 91.13% and 98.67%, respectively; and the catalyst performed well under the condition of the complex gas composition: it had a high catalytic reduction property, a high resistance to loss, and a stable performance.

Example 5: the method for preparing the catalyst of this example was basically the same as that of Example 4, except that in the step (4) ammonium hydroxide was added dropwise to adjust the pH value of the system to 3;

The application of the catalyst of this example was the same as that of the method of Example 4, and the test results were as follows: when at the temperature of 150° C., the catalyst $Ce_7Cu_8/TiO_2$ (pH=3) for the low-temperature synergistic catalytic purification of $NO_x$ and HCN was used, the purification efficiencies of $NO_x$ and HCN were 89.16% and 95.63%, respectively.

Example 6: the method for preparing the catalyst of this example was basically the same as that of Example 4, except that in the step (4) ammonium hydroxide was added dropwise to adjust the pH value of the system to 5;

The application of the catalyst of this example was the same as that of the method of Example 4, and the test results were as follows: when at the temperature of 150° C., the catalyst $Ce_7Cu_8/TiO_2$ (pH=5) for the low-temperature synergistic catalytic purification of $NO_x$ and HCN was used, the purification efficiencies of $NO_x$ and HCN were 88.27% and 91.49%, respectively. Comparative Example 3: the method for preparing the catalyst of this comparative example was basically the same as that of Example 4, except that in the step (4) ammonium hydroxide was added dropwise to adjust the pH value of the system to 2.

The application of the catalyst of this comparative example was the same as that of the method of Example 4, and the test results were as follows: when at the temperature of 150° C., the catalyst $Ce_7Cu_8/TiO_2$ (pH=2) for the low-temperature synergistic catalytic purification of $NO_x$ and HCN was used, the purification efficiencies of $NO_x$ and HCN were 53.27% and 57.31%, respectively.

Comparative Example 4: the method for preparing the catalyst of this comparative example was basically the same as that of Example 4, except that in the step (4) ammonium hydroxide was added dropwise to adjust the pH value of the system to 6.

The application of the catalyst of this comparative example was the same as that of the method of Example 4, and the test results were as follows: when at the temperature of 150° C., the catalyst $Ce_7Cu_8/TiO_6$ (pH=6) for the low-temperature synergistic catalytic purification of $NO_x$ and HCN was used, the purification efficiencies of $NO_x$ and HCN were 45.46% and 48.19%, respectively.

Example 7: in this example, the carrier of the catalyst for the low-temperature synergistic catalytic purification of $NO_x$ and HCN in the flue gas was $TiO_2$, the active components were $CeO_2$ and $MnO_2$, and the mass percentage of the active components ($CeO_2$ and $MnO_2$) was 5%, where $CeO_2$ was 3% and $MnO_2$ was 2%, and this was recorded as $Ce_3Mn_2/TiO_2$.

A method of preparing a catalyst for low-temperature synergistic catalytic purification of $NO_x$ and HCN in flue gas, included the following specific steps:

(1) the active metal salt $Ce(NO_3)_3 \cdot 6H_2O$ was dissolved in deionized water, then added with a $Mn(NO_3)_2$ solution and mixed uniformly to obtain a metal salt solution; where the concentration of the metal cation in the solution was 0.162 mol/L;

(2) citric acid was dissolved in ethanol under stirring to obtain a citric acid/ethanol solution, where the molar ratio of citric acid to tetrabutyl titanate was 1.1:1, and the concentration of citric acid in the citric acid/ethanol solution was 0.26 g/mL; then tetrabutyl titanate was added into the citric acid/ethanol solution, mixed uniformly, and reacted for 20 min to obtain a tetrabutyl titanate-citric acid/ethanol solution, where the volume ratio of the citric acid/ethanol solution to tetrabutyl titanate was 2.4:1;

(3) glacial acetic acid was added dropwise into the tetrabutyl titanate-citric acid/ethanol solution of step (2) under stirring for 40 min to obtain a solution A; where the volume ratio of glacial acetic acid to tetrabutyl titanate was 0.86:1;

(4) the metal salt solution of the step (1) was added dropwise into the solution A of the step (3), mixed uniformly, and added with nitric acid, where the volume ratio of nitric acid to tetrabutyl titanate was 0.86:1; then ammonium hydroxide was added dropwise to adjust the pH value of the system to 5, and the temperature was raised at a constant speed until the temperature was 80° C. to obtain a gel B; where the constant rate of temperature rising was 3.5° C./h; and (5) the gel B of the step (4) was subjected to a treatment under a condition of a temperature of 110° C. for 2 days, and then baked at a temperature of 450° C. for 4 h, cooled in the furnace, pulverized, tableted and sieved to obtain the catalyst $Ce_3Mn_2/TiO_2$ for the low-temperature synergistic catalytic purification of $NO_x$ and HCN in the flue gas.

The method of applying this example in the low-temperature synergistic catalytic purification of $NO_x$ and HCN in the coke oven flue gas, included the following specific steps:

(1) placing the catalyst $Ce_3Mn_2/TiO_2$ for the low-temperature synergistic catalytic purification of $NO_x$ and HCN in the flue gas of this example in a fixed bed quartz tube reactor;

(2) the temperature of the fixed bed reactor was set as 150° C., and the simulated flue gas was mixed uniformly and introduced into the reactor for a catalytic reaction, where the simulated flue gas contained 300 ppm of $NO_x$, 100 ppm of HCN, 250 ppm of $NH_3$, had a relative humidity of 10%, a $O_2$ volume fraction of 5%, and the balance of $N_2$; the total gas flow rate was 600 mL/min, and the reactor air speed was 50,000 $h^{-1}$; and (3) the concentrations of $NO_x$, HCN, $NH_3$, CO, and $CO_2$ in the simulated flue gas at the outlet of the fixed reactor in the step (2) was detected.

The test results were as follows: when at the temperature of 150° C., the catalyst $Ce_3Mn_2/TiO_2$ (pH=5) for the low-temperature synergistic catalytic purification of $NO_x$ and HCN was used, the purification efficiencies of $NO_x$ and HCN reached 89.28% and 96.67%, respectively; and the catalyst performed well under the condition of the complex gas composition: it had a high anti-poisoning performance, high catalytic efficiency, a stable performance, and a long service life.

Comparative Example 5: the method for preparing the catalyst of this comparative example was basically the same as that of Example 7, except that in the step (4) ammonium hydroxide was added dropwise to adjust the pH value of the system to 7.

The application of the catalyst of this comparative example was the same as that of the method of Example 7, and the test results were as follows: when at the temperature of 150° C., the catalyst $Ce_3Mn_2/TiO_2$ (pH=7) for the low-temperature synergistic catalytic purification of $NO_x$ and HCN was used, the purification efficiencies of $NO_x$ and HCN were 35.77% and 47.09%, respectively.

Example 8: in this example, the carrier of the catalyst for the low-temperature synergistic catalytic purification of $NO_x$ and HCN in the flue gas was $TiO_2$, the active components were $La_2O_3$ and CoO, and the mass percentage of the active components ($La_2O_3$ and CoO) was 8%, where $La_2O_3$ was 2% and CoO was 6%, and this was recorded as $La_2Co_6/TiO_2$.

A method of preparing a catalyst for low-temperature synergistic catalytic purification of $NO_x$ and HCN in flue gas, included the following specific steps:

(1) the active metal salt ($La(NO_3)_3 \cdot 6H_2O$ and $Co(NO_3)_2 \cdot 6H_2O$) was dissolved in deionized water to obtain a metal salt solution; and the concentration of the metal cation in the solution was 0.37 mol/L;

(2) citric acid was dissolved in ethanol under stirring to obtain a citric acid/ethanol solution, where the molar ratio of citric acid to tetrabutyl titanate was 1.2:1, and the concentration of citric acid in the citric acid/ethanol solution was 0.22 g/ml; then tetrabutyl titanate was added into the citric acid/ethanol solution, mixed uniformly, and reacted for 23 min to obtain a tetrabutyl titanate-citric acid/ethanol solution, where the volume ratio of the citric acid/ethanol solution to tetrabutyl titanate was 2.7:1;

(3) glacial acetic acid was added dropwise into the tetrabutyl titanate-citric acid/ethanol solution of step (2) under stirring for 37 min to obtain a solution A; where the volume ratio of glacial acetic acid to tetrabutyl titanate was 0.8:1;

(4) the metal salt solution of the step (1) was added dropwise into the solution A of the step (3), mixed uniformly, and added with nitric acid, where the volume ratio of nitric acid to tetrabutyl titanate was 0.8:1; then ammonium hydroxide was added dropwise to adjust the pH value of the system to 3, and the temperature was raised at a constant speed until the temperature was 75° C. to obtain a gel B; where the constant rate of temperature rising was 2.7.0° C./h; and (5) the gel B of the step (4) was subjected to a treatment under a condition of a temperature of 110° C. for 2 days, and then baked at a temperature of 500° C. for 3 h, cooled in the furnace, pulverized, tableted and sieved to obtain the catalyst $La_2Co_6/TiO_2$ for the low-temperature synergistic catalytic purification of $NO_x$ and HCN in the flue gas.

The method of applying this example in the low-temperature synergistic catalytic purification of $NO_x$ and HCN in the coke oven flue gas, included the following specific steps:

(1) placing the catalyst $La_2Co_6/TiO_2$ for the low-temperature synergistic catalytic purification of $NO_x$ and HCN in the flue gas of this example in a fixed bed quartz tube reactor;

(2) the temperature of the fixed bed reactor was set as 150° C., and the simulated flue gas was mixed uniformly and introduced into the reactor for a catalytic reaction, where the simulated flue gas contained 300 ppm of $NO_x$, 100 ppm of HCN, 250 ppm of $NH_3$, had a relative humidity of 10%, a $O_2$ volume fraction of 5%, and the balance of $N_2$; the total gas flow rate was 600 mL/min, and the reactor air speed was 50,000 $h^{-1}$; and (3) the concentrations of $NO_x$, HCN, $NH_3$, CO, and $CO_2$ in the simulated flue gas at the outlet of the fixed reactor in the step (2) was detected.

The test results were as follows: when at the temperature of 150° C., the catalyst $La_2Co_6/TiO_2$ (pH=3) for the low-temperature synergistic catalytic purification of $NO_x$ and HCN was used, the purification efficiencies of $NO_x$ and HCN reached 88.18% and 89.49%, respectively; and the catalyst performed well under the condition of the complex gas composition: it had a high anti-poisoning performance, high catalytic efficiency, a stable performance, and a long service life.

Example 9: in this example, the carrier of the catalyst for the low-temperature synergistic catalytic purification of $NO_x$ and HCN in the flue gas was $TiO_2$, the active components were $La_2O_3$ and MnO, and the mass percentage of the active components ($La_2O_3$ and MnO) was 12%, where $La_2O_3$ was 3% and MnO was 9%, and this was recorded as $La_3Mn_9/TiO_2$.

A method of preparing a catalyst for low-temperature synergistic catalytic purification of $NO_x$ and HCN in flue gas, included the following specific steps:

(1) the active metal salt $La(NO_3)_3 \cdot 6H_2O$ was dissolved in deionized water, then added with a $Mn(NO_3)_2$ solution and mixed uniformly to obtain a metal salt solution; where the concentration of the metal cation in the solution was 0.488 mol/L;

(2) citric acid was dissolved in ethanol under stirring to obtain a citric acid/ethanol solution, where the molar ratio of citric acid to tetrabutyl titanate was 1.15:1, and the concentration of citric acid in the citric acid/ethanol solution was 0.24 g/mL; then tetrabutyl titanate was added into the citric acid/ethanol solution, mixed uniformly, and reacted for 27 min to obtain a tetrabutyl titanate-citric acid/ethanol solution, where the volume ratio of the citric acid/ethanol solution to tetrabutyl titanate was 4.2:1;

(3) glacial acetic acid was added dropwise into the tetrabutyl titanate-citric acid/ethanol solution of step (2) under stirring for 40 min to obtain a solution A; where the volume ratio of glacial acetic acid to tetrabutyl titanate was 1.2:1;

(4) the metal salt solution of the step (1) was added dropwise into the solution A of the step (3), mixed uniformly, and added with nitric acid, where the volume ratio of nitric acid to tetrabutyl titanate was 1.2:1; then ammonium hydroxide was added dropwise to adjust the pH value of the system to 9, and the temperature was raised at a constant speed until the temperature was 75° C. to obtain a gel B; where the constant rate of temperature rising was 2.8° C./h; and (5) the gel B of the step (4) was subjected to a treatment under a condition of a temperature of 100° C. for 2.8 days, and then baked at a temperature of 300° C. for 3.5 h, cooled in the furnace, pulverized, tableted and sieved to obtain the catalyst $La_3Mn_9/TiO_2$ for the low-temperature synergistic catalytic purification of $NO_x$ and HCN in the flue gas.

The method of applying this example in the low-temperature synergistic catalytic purification of $NO_x$ and HCN in the coke oven flue gas, included the following specific steps:

(1) placing the catalyst $La_3Mn_9/TiO_2$ for the low-temperature synergistic catalytic purification of $NO_x$ and HCN in the flue gas of this example in a fixed bed quartz tube reactor;

(2) the temperature of the fixed bed reactor was set as 150° C., and the simulated flue gas was mixed uniformly and introduced into the reactor for a catalytic reaction, where the simulated flue gas contained 300 ppm of $NO_x$, 100 ppm of HCN, 250 ppm of $NH_3$, had a relative humidity of 10%, a $O_2$ volume fraction of 5%, and the balance of $N_2$; the total gas flow rate was 600 mL/min, and the reactor air speed was 50,000 $h^{-1}$; and (3) the concentrations of $NO_x$, HCN, $NH_3$, CO, and $CO_2$ in the simulated flue gas at the outlet of the fixed reactor in the step (2) was detected.

The test results were as follows: when at the temperature of 150° C., the catalyst $La_3Mn_9/TiO_2$ (pH=9) for the low-temperature synergistic catalytic purification of $NO_x$ and HCN of this example was used, the purification efficiencies of $NO_x$ and HCN reached 90.28% and 94.67%, respectively; and the catalyst performed well under the condition of the complex gas composition: it had a high anti-poisoning performance, high catalytic efficiency, a stable performance, and a long service life.

What is claimed is:

1. A method of preparing a catalyst for low-temperature synergistic catalytic purification of $NO_x$ and HCN in flue gas, comprising the following specific steps:
   (1) dissolving an active metal salt in deionized water to obtain a metal salt solution, wherein the active metal salt is two or more of a lanthanum salt, a cobalt salt, an aluminum salt, a copper salt, an iron salt, a manganese salt, a cerium salt, a nickel salt and a niobium salt;
   (2) dissolving citric acid in ethanol under stirring to obtain a citric acid/ethanol solution; then adding tetrabutyl titanate into the citric acid/ethanol solution, mixing uniformly, and reacting for 20-30 min to obtain a tetrabutyl titanate-citric acid/ethanol solution;
   (3) adding glacial acetic acid dropwise into the tetrabutyl titanate-citric acid/ethanol solution of the step (2) under stirring to react for 30-40 min to obtain a solution A;
   (4) adding the metal salt solution of the step (1) dropwise into the solution A of the step (3), mixing uniformly and adding nitric acid, then adding ammonium hydroxide dropwise to adjust the pH value of the system to 3-5 or 9-11, and rising the temperature at a constant speed until the temperature is 70-80° C. to obtain a gel B; and
   (5) subjecting the gel B of the step (4) to a constant-temperature treatment under a condition of a temperature of 90-110° C. for 2-3 days, then baking under a condition of a temperature of 300-500° C. for 3-4 h in a furnace, cooling in the furnace, pulverizing, tableting, and sieving to obtain a catalyst M-N/$TiO_2$ for low-temperature synergistic catalytic purification of $NO_x$ and HCN in the flue gas, wherein M-N is two or more metal oxides of active metals lanthanum, cobalt, aluminum, copper, iron, manganese, cerium, nickel and niobium.

2. The method of preparing a catalyst for low-temperature synergistic catalytic purification of $NO_x$ and HCN in flue gas according to claim 1, wherein the mass percentage of the active metal oxide M-N in the catalyst M-N/$TiO_2$ is 5%-15%.

3. The method of preparing a catalyst for low-temperature synergistic catalytic purification of $NO_x$ and HCN in flue gas according to claim 1, wherein the molar ratio of citric acid to tetrabutyl titanate in the step (2) is (1-1.2):1, and the concentration of citric acid in the citric acid/ethanol solution is 0.16-0.26 g/mL.

4. The method of preparing a catalyst for low-temperature synergistic catalytic purification of $NO_x$ and HCN in flue gas according to claim 1, wherein the volume ratio of the citric acid/ethanol solution to tetrabutyl titanate in the step (2) is (2.4-4.1):1.

5. The method of preparing a catalyst for low-temperature synergistic catalytic purification of $NO_x$ and HCN in flue gas according to claim 1, wherein the volume ratio of glacial acetic acid to tetrabutyl titanate in the step (3) is (0.6-1.4):1.

6. The method of preparing a catalyst for low-temperature synergistic catalytic purification of $NO_x$ and HCN in flue gas according to claim 1, wherein the volume ratio of nitric acid to tetrabutyl titanate in the step (4) is (0.6-1.4):1, and the constant rate of temperature rising is 2.5-3.5° C./h.

7. A catalyst prepared by the method of preparing a catalyst for low-temperature synergistic catalytic purification of $NO_x$ and HCN in flue gas according to claim 1.

8. A catalyst prepared by the method of preparing a catalyst for low-temperature synergistic catalytic purification of $NO_x$ and HCN in flue gas according to claim 2.

9. A catalyst prepared by the method of preparing a catalyst for low-temperature synergistic catalytic purification of $NO_x$ and HCN in flue gas according to claim 3.

10. A catalyst prepared by the method of preparing a catalyst for low-temperature synergistic catalytic purification of $NO_x$ and HCN in flue gas according to claim 4.

11. A catalyst prepared by the method of preparing a catalyst for low-temperature synergistic catalytic purification of $NO_x$ and HCN in flue gas according to claim 5.

12. A catalyst prepared by the method of preparing a catalyst for low-temperature synergistic catalytic purification of $NO_x$ and HCN in flue gas according to claim 6.

13. Use of the catalyst according to claim 7 in low-temperature synergistic catalytic purification of $NO_x$ and HCN in flue gas.

14. Use of the catalyst according to claim 8 in low-temperature synergistic catalytic purification of $NO_x$ and HCN in flue gas.

15. Use of the catalyst according to claim 9 in low-temperature synergistic catalytic purification of $NO_x$ and HCN in flue gas.

16. Use of the catalyst according to claim 10 in low-temperature synergistic catalytic purification of $NO_x$ and HCN in flue gas.

17. Use of the catalyst according to claim 11 in low-temperature synergistic catalytic purification of $NO_x$ and HCN in flue gas.

18. Use of the catalyst according to claim 12 in low-temperature synergistic catalytic purification of $NO_x$ and HCN in flue gas.

* * * * *